United States Patent
Paggen

(10) Patent No.: US 8,131,871 B2
(45) Date of Patent: Mar. 6, 2012

(54) METHOD AND SYSTEM FOR THE AUTOMATIC REROUTE OF DATA OVER A LOCAL AREA NETWORK

(75) Inventor: Christophe Paggen, Neupre (BE)

(73) Assignee: Cisco Technology, Inc., San Jose, CA (US)

(*) Notice: Subject to any disclaimer, the term of this patent is extended or adjusted under 35 U.S.C. 154(b) by 305 days.

(21) Appl. No.: 11/331,319

(22) Filed: Jan. 12, 2006

(65) Prior Publication Data

US 2007/0162612 A1    Jul. 12, 2007

(51) Int. Cl.
*G06F 15/173*    (2006.01)
*H04L 12/56*    (2006.01)

(52) U.S. Cl. ........ 709/238; 709/201; 709/220; 709/223; 709/224; 709/225; 709/226; 709/227; 709/230; 709/239; 709/240; 709/241; 709/242; 709/249; 709/250; 709/251; 370/389; 370/390; 370/392; 370/401; 370/402; 370/403; 370/404; 370/405; 370/406; 370/407; 370/408; 370/409; 370/428; 370/429

(58) Field of Classification Search .................. 709/238, 709/201, 223, 226, 227, 230, 249, 250, 251; 370/389, 392, 390, 401–406, 408, 407, 409, 370/428, 429

See application file for complete search history.

(56) References Cited

U.S. PATENT DOCUMENTS

| | | | | |
|---|---|---|---|---|
| 5,535,373 A * | 7/1996 | Olnowich | ........................ | 703/25 |
| 5,579,477 A * | 11/1996 | Ogletree | ........................ | 714/44 |
| 5,612,953 A * | 3/1997 | Olnowich | ..................... | 370/367 |
| 5,680,402 A * | 10/1997 | Olnowich et al. | ............. | 370/498 |
| 5,841,990 A * | 11/1998 | Picazo et al. | .................. | 709/249 |
| 5,914,938 A * | 6/1999 | Brady et al. | .................. | 370/254 |
| 5,914,953 A * | 6/1999 | Krause et al. | .................. | 370/392 |
| 6,006,275 A * | 12/1999 | Picazo et al. | .................. | 709/249 |
| 6,064,675 A * | 5/2000 | Alexander et al. | ............ | 370/401 |
| 6,181,680 B1 * | 1/2001 | Nagata et al. | ................. | 370/248 |
| 6,185,203 B1 * | 2/2001 | Berman | ........................ | 370/351 |
| 6,246,692 B1 * | 6/2001 | Dai et al. | ...................... | 370/438 |
| 6,263,374 B1 * | 7/2001 | Olnowich et al. | ............. | 709/253 |
| 6,570,845 B1 * | 5/2003 | Blanc et al. | .................. | 370/218 |

(Continued)

OTHER PUBLICATIONS

"Product Description: SM-2601F Link Protector" [On-Line], Shore Microsystems, Long Branch, NJ, [archived on Feb. 16, 2005], Retrieved from the Internet: <URL: http://web.archive.org/web/20050216180058/ http://www.shoremicro.com/html/ sm-2601f.shtml, 2 pgs.

*Primary Examiner* — Hassan Phillips
*Assistant Examiner* — Saket K Daftuar
(74) *Attorney, Agent, or Firm* — Schwegman, Lundberg & Woessner, P.A.

(57) ABSTRACT

A method and system for rerouting data over a local area network is provided. The method comprises defining at least one port group associated with a bridging device, each port group including interfaces linked to the bridging device. A plurality of statuses for each port group is defined, the status being dependent on the individual statuses of the interfaces linked to the bridging device. At least one target port associated with each port group, each target port relating to a path for data. The method further comprises defining an action for each status of a port group and monitoring the status of the interfaces forming part of each port group. In response to determining the status of a port group, triggering the predefined action associated with the port group status at one of the port group's target ports.

13 Claims, 5 Drawing Sheets

U.S. PATENT DOCUMENTS

| | | | |
|---|---|---|---|
| 6,603,769 B1 * | 8/2003 | Thubert et al. | 370/401 |
| 6,621,515 B2 * | 9/2003 | Matthews et al. | 348/14.11 |
| 6,687,360 B2 * | 2/2004 | Kung et al. | 379/211.02 |
| 6,813,642 B2 * | 11/2004 | Lin et al. | 709/232 |
| 6,898,189 B1 * | 5/2005 | Di Benedetto et al. | 370/256 |
| 6,904,053 B1 * | 6/2005 | Berman | 370/466 |
| 6,915,445 B2 * | 7/2005 | Navar et al. | 714/4 |
| 6,922,391 B1 * | 7/2005 | King et al. | 370/229 |
| 6,941,384 B1 * | 9/2005 | Aiken et al. | 709/250 |
| 6,966,018 B2 * | 11/2005 | Hilliges | 714/724 |
| 6,970,451 B1 * | 11/2005 | Greenberg et al. | 370/352 |
| 6,981,174 B1 * | 12/2005 | Hanning | 714/5 |
| 6,996,628 B2 * | 2/2006 | Keane et al. | 709/238 |
| 7,089,335 B2 * | 8/2006 | Aiken et al. | 709/250 |
| 7,093,027 B1 * | 8/2006 | Shabtay et al. | 709/239 |
| 7,596,101 B2 * | 9/2009 | Oguchi | 370/256 |
| 7,616,633 B2 * | 11/2009 | Aiken et al. | 370/389 |
| 2002/0070725 A1 * | 6/2002 | Hilliges | 324/158.1 |
| 2002/0099937 A1 * | 7/2002 | Tuomenoksa | 713/153 |
| 2003/0081114 A1 * | 5/2003 | Matthews et al. | 348/14.11 |
| 2004/0218591 A1 * | 11/2004 | Ogawa et al. | 370/364 |
| 2005/0180409 A1 * | 8/2005 | King et al. | 370/360 |
| 2005/0198232 A1 * | 9/2005 | Haalen et al. | 709/221 |
| 2005/0220036 A1 * | 10/2005 | Sugitani et al. | 370/252 |
| 2005/0228531 A1 * | 10/2005 | Genovker et al. | 700/130 |
| 2005/0232207 A1 * | 10/2005 | Antoniadis et al. | 370/338 |
| 2005/0259634 A1 * | 11/2005 | Ross | 370/351 |
| 2006/0010265 A1 * | 1/2006 | Aiken et al. | 710/33 |
| 2006/0083182 A1 * | 4/2006 | Tracey | 370/260 |
| 2006/0253605 A1 * | 11/2006 | Sundarrajan et al. | 709/238 |

* cited by examiner

METHOD AND SYSTEM FOR THE AUTOMATIC REROUTE OF DATA OVER A LOCAL AREA NETWORK

TECHNICAL FIELD

The present application relates to the field of automatically rerouting data within a local area network. In an example embodiment, the application relates to rerouting data in the event that a link to an inline bridging device or the bridging device itself fails.

BACKGROUND

Various network appliances, such as intrusion prevention systems (IPS), network monitor probes, anti-virus and e-mail filters, exist to fulfill specialized requirements within a local area network (LAN). Typically, these appliances are attached to existing networking infrastructure equipment, such as LAN switches, to bridge certain segments of a network, thereby to provide the specialized requirements. The network appliances may be either internal or external devices and typically function as inline devices.

For example, an IPS device may be used to bridge two LAN segments together and exercise access control to protect computers within a segment of the LAN. Malicious and legitimate traffic both attempt to gain access to the internal virtual LAN (VLAN) segment of a network and, to do so, traffic enters a LAN switch which forms part of an external VLAN. The IPS device, which is an external inline device, bridges the external and internal VLANs together and thereby forms the only path between the external VLAN and the internal corporate VLAN. Before passing any traffic on to the internal VLAN, the IPS device weeds out undesirable traffic (e.g., malicious traffic), but allows legitimate traffic through.

In the event that connectivity to the IPS device fails, for example, when one of the interfaces that links to the IPS device to form the bridge fails, or when the IPS device itself fails, the traffic flow to the internal corporate VLAN, whether legitimate or malicious, is disrupted. Without a sustained flow of traffic, the corporate network environment may be critically impacted.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present application relates to a system and method for the automatic rerouting of data over a local area network (LAN).

Figure 1:
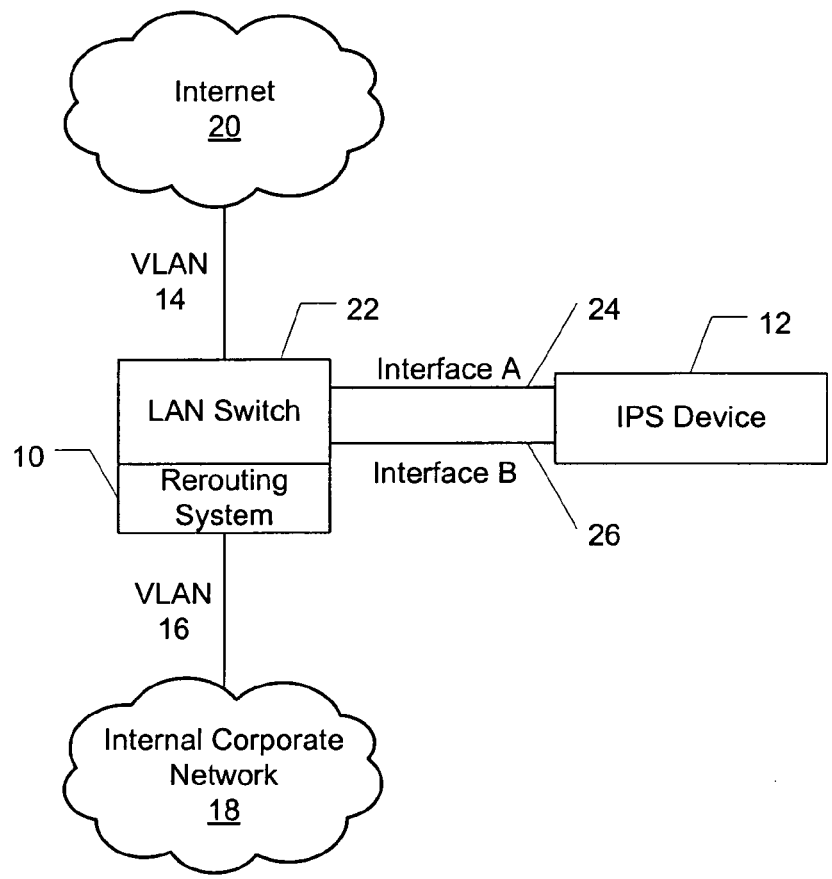
FIG. 1 is a high level schematic diagram depicting a typical implementation of a system for the automatic rerouting of data over a local area network in accordance with an example embodiment.

FIG. 1 shows an example embodiment of an implementation of a system 10 for the automatic rerouting of data. The system 10 is typically used with internal or external inline bridging devices. As described by way of example, bridging devices may be network appliances that are attached to existing networking infrastructure equipment, such as LAN switches, to bridge certain segments of a network, thereby to provide specialized requirements to the network. Examples of bridging devices include intrusion prevention system (IPS) devices, network monitor probes, anti-virus and e-mail filters and Layer-7 load balancers.

In the example embodiment of FIG. 1, the inline bridging device is shown to be an IPS device 12 that bridges an external LAN segment that is part of a virtual LAN (VLAN) 14 with an internal LAN segment, VLAN 16, on which a corporate client network 18 resides. The external LAN segment or VLAN 14 represents clients beyond the control of the corporate network, e.g. hosts on the Internet 20. Both malicious and legitimate traffic attempt to gain access to the internal corporate network VLAN 16, by entering a LAN switch 22 via an interface that forms part of VLAN 14.

The IPS device 12 bridges VLAN 14 and VLAN 16 together, via the LAN switch 22, thereby creating the only possible path for traffic to enter the internal corporate network. The IPS device 12 is linked to the LAN switch 22 via Interface A 24 and Interface B 26. Due to this configuration, the IPS device 12 is able to weed out undesirable and malicious traffic and to let legitimate traffic through to the internal corporate network 18 on VLAN 16.

In this example embodiment, the rerouting system 10 forms part of the LAN switch 22. As will be described in more detail below, the rerouting system 10 monitors Interface A and Interface B thereby to determine the status of a port group.

Figure 2:
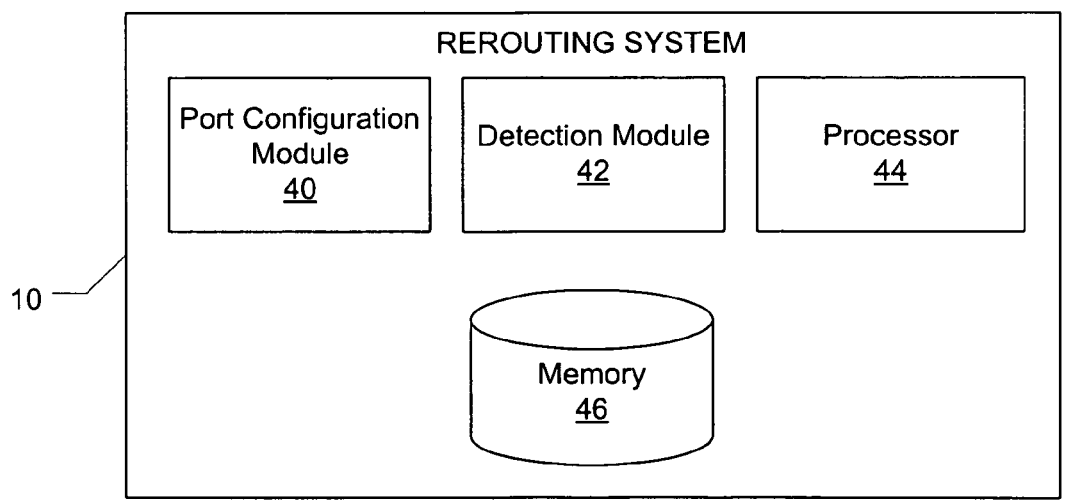
FIG. 2 is a block diagram illustrating a system for the automatic rerouting of data over a local area network in accordance with an example embodiment.

Turning to FIG. 2, the rerouting system 10 is shown to include a port configuration module 40, a detection module 42, a processor 44 and a memory 46.

The port configuration module 40 is used by an administrator or user of the internal corporate network to set up parameters for the rerouting system 10 in accordance with the specific requirements for the implementation of the rerouting system 10. In particular, the port configuration module 40 is used to define at least one port group associated with the IPS device 12, where each port group includes a number of interfaces linked to the IPS device 12. The port configuration module 40 is also used to define a plurality of statuses for each port group, the statuses typically being an active status or an inactive status. The status for each port group will be dependent on the individual statuses of the interfaces linked to the IPS device 12. However, the status may also be dependent on the status of the IPS device 12. The port configuration module 40 is further used to define at least one target port associated with each port group, with each target port relating to a path or destination for data or traffic that is being bridged by the IPS device 12. An action for each status of a port group is also defined by using the port configuration module 40.

The detection module 42 monitors and detects the status of the interfaces of each port group. The detection module 42 may further monitor and detect the status of the IPS device 12.

The detection module 42 may operate by either sending or receiving signals to the respective interface or IPS device 12 in order to establish whether the interface or device is active or inactive. In an example embodiment, IEEE standard 802.3 and its extension 802.3z define protocols and mechanisms such as Far-End Fault-Indication (FEFI) and Gigabit-Ethernet Auto-negotiation are used to detect whether a given physical link is able to receive and transmit data. The detection module 42 can process FEFI and/or Gigabit-Ethernet Auto-negotiation messages and place the physical port into a non-operational state if need be.

The processor 44 determines, in response to detecting the status of the interfaces of each port group and the bridging device, a status for each port group in accordance with the predefined status of each port group. In response to determining an inactive status for a port group, the processor triggers a predefined action associated with the port group status at one of the port group's target ports.

The memory 46 is used to store data and information relating to the defined port groups, interfaces associated with the port groups, the at least one target ports associated with each port group and the action for each status of a port group.

For example, for the system of FIG. 1, a port group 1 may be defined by a user, with Interface A 24 and Interface B 26 both being included as interfaces in port group 1 linking to the IPS device 12. The active and inactive statuses for port group 1 is shown in the Table 1 below, where "0" indicates an inactive status for an interface or bridging device (IPS device 12) and "1" indicates an active status for an interface or bridging device (IPS device 12):

TABLE 1

Status Table for Port Group 1

|  | STATUS | | | | | | | |
| --- | --- | --- | --- | --- | --- | --- | --- | --- |
| PORT GROUP 1 | 1 | 0 | 0 | 0 | 0 | 0 | 0 | 0 |
| Interface A | 1 | 0 | 1 | 1 | 1 | 0 | 0 | 0 |
| Interface B | 1 | 1 | 0 | 1 | 0 | 1 | 0 | 0 |
| IPS device | 1 | 1 | 1 | 0 | 0 | 0 | 1 | 0 |

Figure 3:
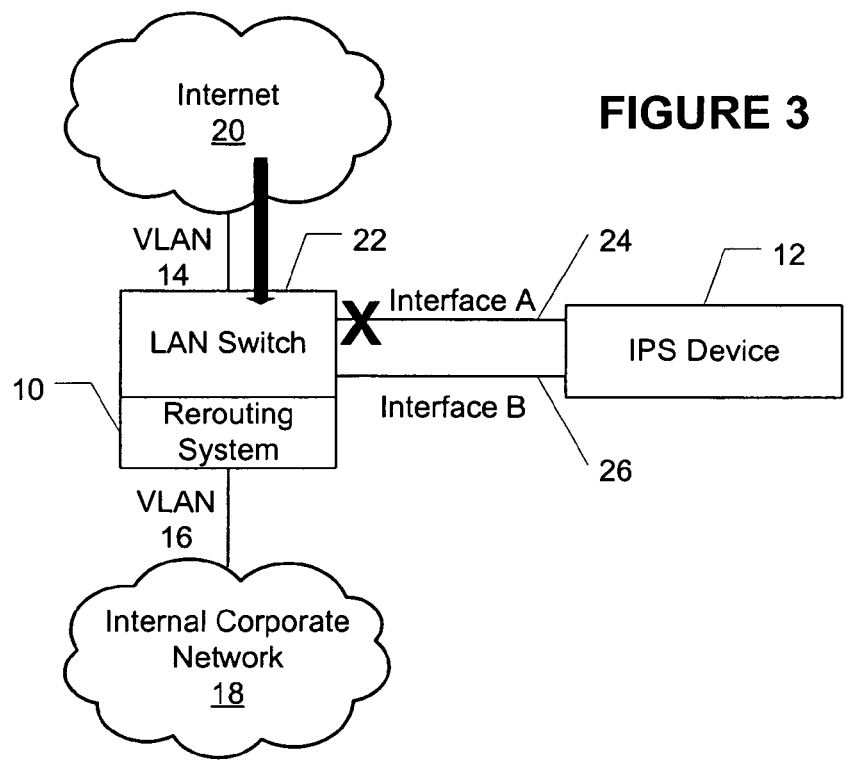
FIG. 3 is the high level schematic diagram of FIG. 1, showing an inactive interface to a bridging device.

As shown in Table 1, whenever any of the interfaces or the IPS device 12 is inactive, typically due to a failure, the status of port group 1 becomes inactive. One such a scenario is shown in FIG. 3, where Interface A 24 is down or inactive. Traffic enters the LAN switch 22 but cannot be bridged via the IPS device 12 to VLAN 16. The detection module 42 of the rerouting system 10 monitors and detects the inactive status of Interface A and the processor 44, using the status table for port group 1, determines an inactive status for Port Group 1. Without the rerouting system 10, the transfer of data or traffic to the internal corporate network 18 would have been disrupted.

In this example embodiment, only one target port is defined for port group 1, namely interface VLAN 16 which links the LAN switch 22 with the internal corporate network 18. Whenever an inactive status is determined by the processor 44, the processor 44 triggers a predefined action to the target port.

Figure 4:
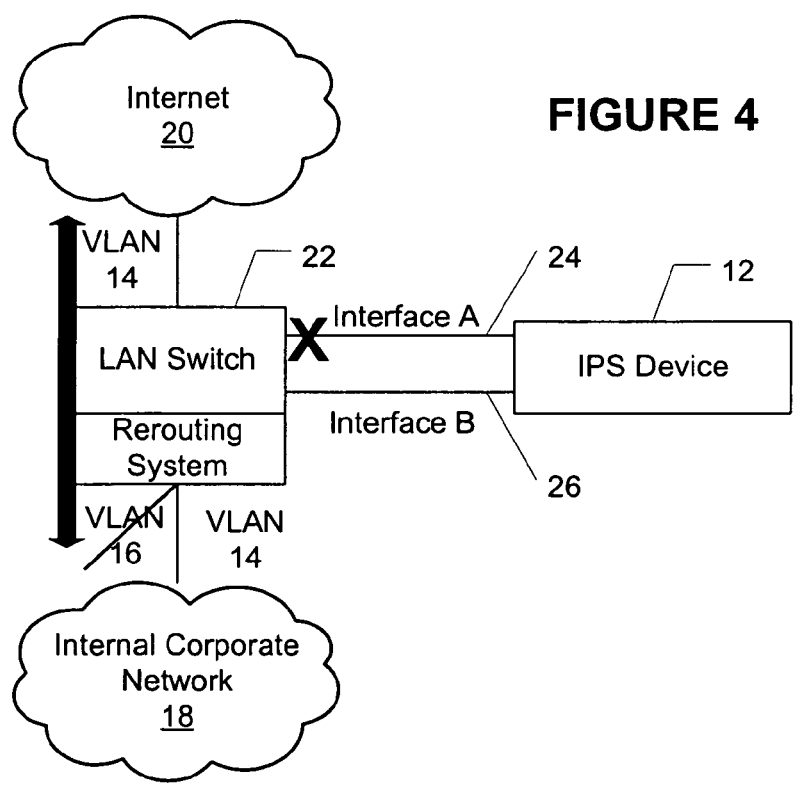
FIG. 4 shows the high level schematic diagram of FIG. 3, in which rerouting of the data is effected by bypassing the bridging device through a LAN switch.

In this example embodiment, the predefined action, as shown in FIG. 4, is to modify the VLAN membership of the target port from VLAN 16 to VLAN 14. In doing so, a Layer-2 bridged path between the external network 20 and the internal corporate network 18 is created. By placing the internal port onto the same VLAN as the external port, connectivity between the external network 20 and the internal corporate network 18 is restored, although traffic is no longer being filtered by the IPS device 12. However, in this example embodiment, at least some level of service is provided.

Figure 5:
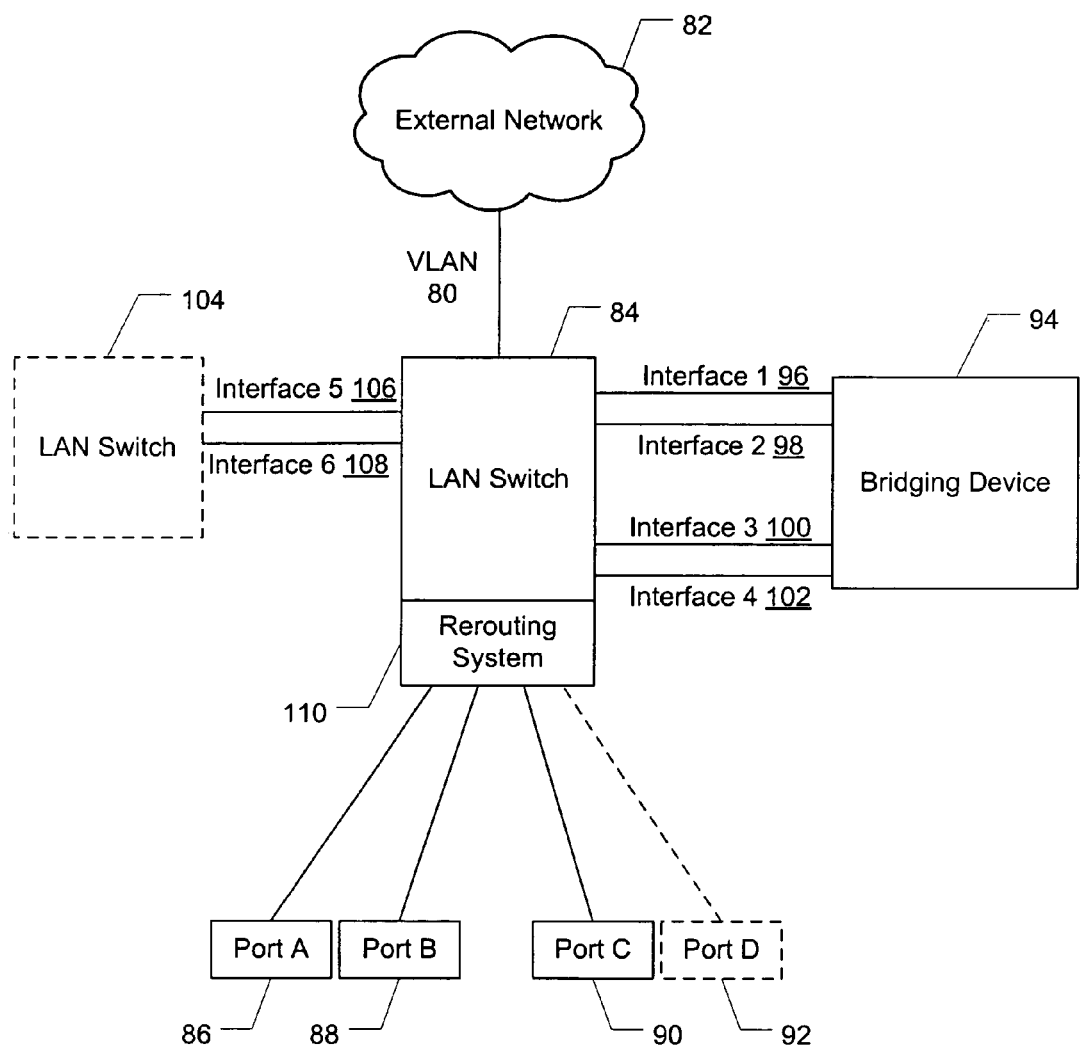
FIG. 5 shows a high level schematic diagram of a generic example embodiment of an implementation of a system for automatically rerouting data in accordance with an example embodiment.

FIG. 5 shows a generic example embodiment of an implementation of a system for rerouting data according to the present application. This implementation will be described by way of example according to the flow diagram as shown in FIG. 6.

A VLAN segment 80 of an external network 82 is bridged via a LAN switch 84 to Port A 86, Port B 88, Port C 90 and backup Port D 92, by inline bridging device 94. VLAN segment 80 is linked to the bridging device 94 by Interface 1 96 and Interface 2 98, while the bridging device 94 is linked to Port A 86, Port B 88, Port C 90 and backup Port D 92, via LAN switch 84, by the Interface 3 100 and the Interface 4 102. The LAN switch 84 is also connected to backup a LAN switch 104 via an Interface 5 106 and an Interface 6 108. The rerouting system 110 of this example embodiment also forms part of the LAN switch 84.

Figure 6:
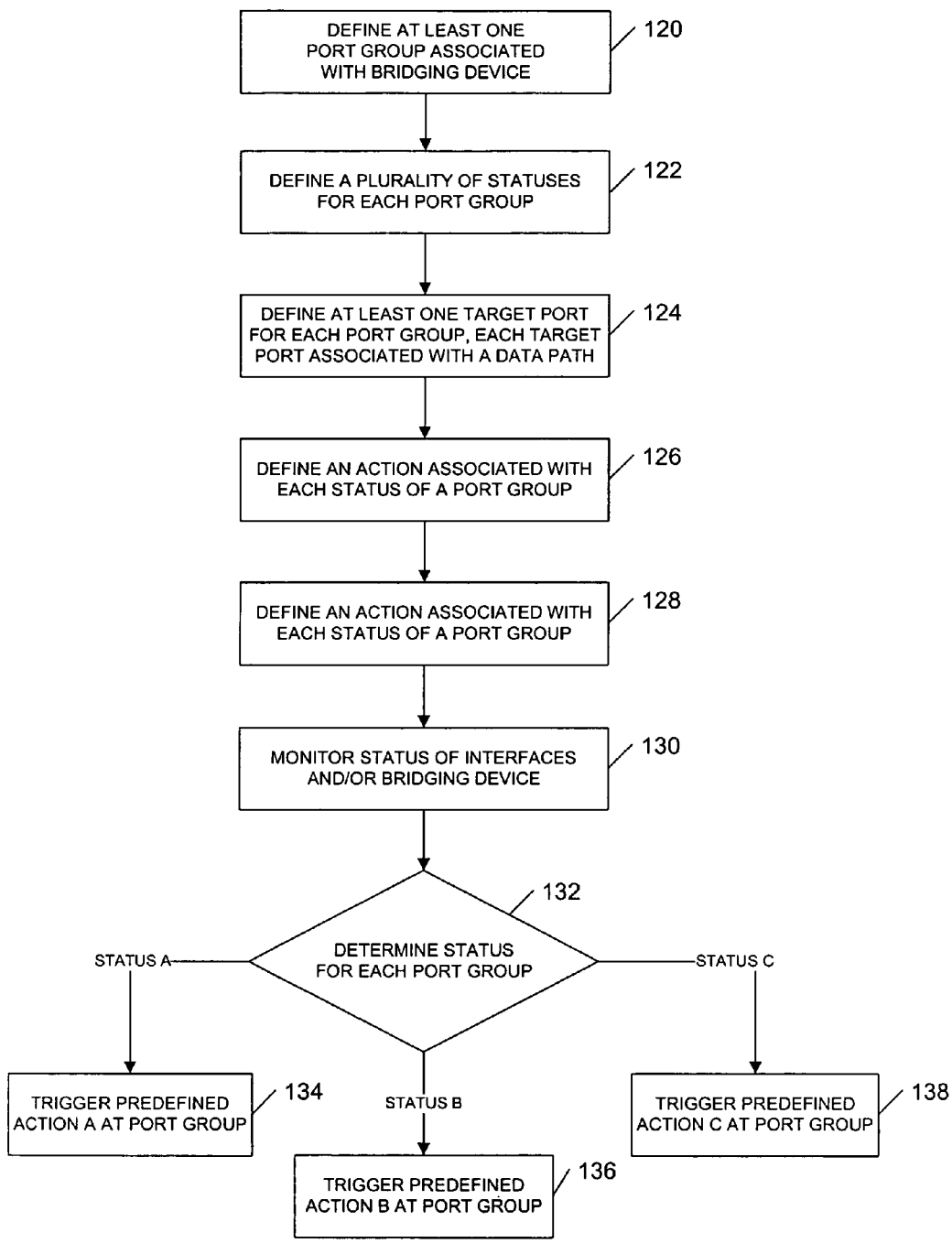
FIG. 6 is a simplified flow diagram illustrating a method of automatically rerouting data over a local area network in accordance with an example embodiment.

As shown in operation 120 of FIG. 6, the port configuration module 40 of the rerouting system 110 is used to define at least one port group associated with the bridging device 94. Each port group includes a number of interfaces linked to the bridging device 94. In this example embodiment, the following port groups with their associated interfaces are defined:

Port Group 1: Interface 1, Interface 2, Interface 3 and Interface 4;
Port Group 2: Interface 1 and Interface 3
Port Group 3: Interface 2 and Interface 4

In operation 122, the port configuration module 40 is used to define a plurality of statuses for each port group. For example, as Port Group 1 includes a variety of interfaces, the status of Port Group 1 may include the following: active—two interfaces on, active—one interface on, inactive—input interfaces down, inactive—output interfaces down and inactive—bridging device failure. Table 2 shows the different statuses for Port Group 1, where "0" is an inactive status, "01" is inactive—input interfaces down, "10" is inactive—output interfaces down, "1" is an active, one interface on and "2" is an active, two interfaces on.

TABLE 2

Status Table for Port Group 1, 4 interfaces

|  | STATUS | | | | | | | | | | | | | | | |
| --- | --- | --- | --- | --- | --- | --- | --- | --- | --- | --- | --- | --- | --- | --- | --- | --- |
| PORT GROUP 1 | 2 | 1 | 1 | 1 | 1 | 1 | 1 | 1 | 1 | 01 | 10 | 0 | 0 | 0 | 0 | 0 | 0 |
| Interface 1 | 1 | 0 | 1 | 1 | 1 | 0 | 1 | 1 | 0 | 1 | 0 | 1 | 0 | 0 | 0 | 0 | 1/0 |
| Interface 2 | 1 | 1 | 0 | 1 | 1 | 1 | 0 | 0 | 1 | 1 | 0 | 0 | 1 | 0 | 0 | 0 | 1/0 |
| Interface 3 | 1 | 1 | 1 | 0 | 1 | 0 | 1 | 0 | 1 | 0 | 1 | 0 | 0 | 1 | 0 | 0 | 1/0 |
| Interface 4 | 1 | 1 | 1 | 1 | 0 | 1 | 0 | 1 | 0 | 0 | 1 | 0 | 0 | 0 | 1 | 0 | 1/0 |
| Bridging device | 1 | 1 | 1 | 1 | 1 | 1 | 1 | 1 | 1 | 1 | 1 | 1 | 1 | 1 | 1 | 1 | 0 |

Both Port Group 2 and 3 are respectively inactive as soon as either interface or the bridging device 94 is inactive. Table 3, which is similar to Table 1 shows this configuration:

TABLE 3

Status Table for Port Group 2 and 3

| | STATUS | | | | | | | |
|---|---|---|---|---|---|---|---|---|
| | 1 | 0 | 0 | 0 | 0 | 0 | 0 | 0 |
| PORT GROUP 2 | | | | | | | | |
| Interface 1 | 1 | 0 | 1 | 1 | 1 | 0 | 0 | 0 |
| Interface 3 | 1 | 1 | 0 | 1 | 0 | 1 | 0 | 0 |
| Bridging device | 1 | 1 | 1 | 0 | 0 | 0 | 1 | 0 |
| PORT GROUP 3 | | | | | | | | |
| Interface 2 | 1 | 0 | 1 | 1 | 1 | 0 | 0 | 0 |
| Interface 4 | 1 | 1 | 0 | 1 | 0 | 1 | 0 | 0 |
| Bridging device | 1 | 1 | 1 | 0 | 0 | 0 | 1 | 0 |

The port configuration module 40 is also used to define at least one target port for each port group, as shown in operation 124. Each target port is typically related to a path or destination for data or traffic that is being bridged by the bridging device 94.

In the example embodiment, Port Group 1 has Port A 86 and Port B 88 as target ports. Port Group 2 has Port B 88 and backup LAN switch 104 as target ports, while Port Group 3 has Port C 90 and backup Port D 92 as target ports.

In operation 126, the port configuration module 40 defines an action associated with each status of a port group. For example, for the system of FIG. 5, the following actions may be associated with the following statuses of Port Group 1:

TABLE 4

Action Table for Port Group 1
PORT GROUP 1

| STATUS | PREDEFINED ACTION |
|---|---|
| Inactive | VLAN membership of Port A and Port B will dynamically be adjusted to VLAN segment 80 |
| Inactive - Input Interfaces Down | VLAN membership of Port A and Port B will dynamically be adjusted to VLAN segment 80, send Input Interface Down alert |
| Inactive - Output Interfaces Down | VLAN membership of Port A and Port B will dynamically be adjusted to VLAN segment 80, send Output Interface Down alert |
| Active, One Interface On | No transmission of data to Port B, traffic directed to Port A |
| Active, Two Interfaces On | No action |

For Port Group 2, the inactive status action is to use the Interface 5 106 and the Interface 6 108 to link to backup LAN switch 104, while the inactive status action for Port Group 3 is to activate and reroute traffic to backup Port D 92. It will be appreciated a type of tag and template approach is provided in some example embodiments. For example, a tag action list may be associated with a port.

It will be appreciated that the predetermined actions may include rerouting data, activating back-up device or sending an error or alert message. In an example embodiment, the status of the interfaces is monitored to determine when a pre-selected number of ports in a port group go down, and a predefined action is triggered in response to the monitoring. As mentioned above, the predefined action may bridge two Local Area Network (LAN) segments, for example, bridge the two LAN segments by dynamically changing a VLAN membership of associated target ports to a selected VLAN membership. Thus, the bridging device may be by-passed under software control.

The method of the example embodiment typically also includes, as shown in operation 128, storing the defined port groups, interfaces associated with the port groups, the at least one target port associated with each port group and the action for each status of a port group in the memory.

As shown in operation 130, the detection module 42 of the rerouting system 10 monitors and detects the status of the various interfaces associated with each port group. The bridging device may also be monitored to detect any change in its status.

The processor 44 of the rerouting system now determines, shown in operation 132, after detecting the status of the interfaces and/or bridging device associated with each port group, the status of each port group by accessing the predefined relationship between the status of the port group and the status of the interfaces and/or bridging device. The predefined status for each port group will typically comprise tables similar to the examples provided above.

In response to determining a status for a port group, as shown in operation 132, the processor triggers a predefined action (operation 134, 136 and 138) associated with the status at one of the target ports of the port group, which action is obtained from the memory.

For example, for the system of FIG. 5, once an inactive status is detected for Port Group 1, the VLAN membership of Port A 86 and Port B 88 will dynamically be adjusted to VLAN segment 80. Should an Active, One Interface On status be determined, the action that is triggered is to stop transmitting data to Port B 88, but only to transmit data to Port A 86.

In the event that an inactive status is determined for Port Group 2, LAN switch 84 uses Interface 5 106 and Interface 6 108 to link to backup LAN switch 104, thereby to reroute traffic or data to this LAN switch. In the event that an inactive status is determined for Port Group 3, the rerouting system activates backup Port D 92, thereby rerouting all data to Port D 92.

It would be appreciated that various port groups, statuses for port groups, target ports associated with a port group and actions associated with each status of a port group may be defined by a user and that these features would typically depend on the application and bridging device used. This predefined data is stored in the memory 46 of the rerouting system 10.

Figure 7:
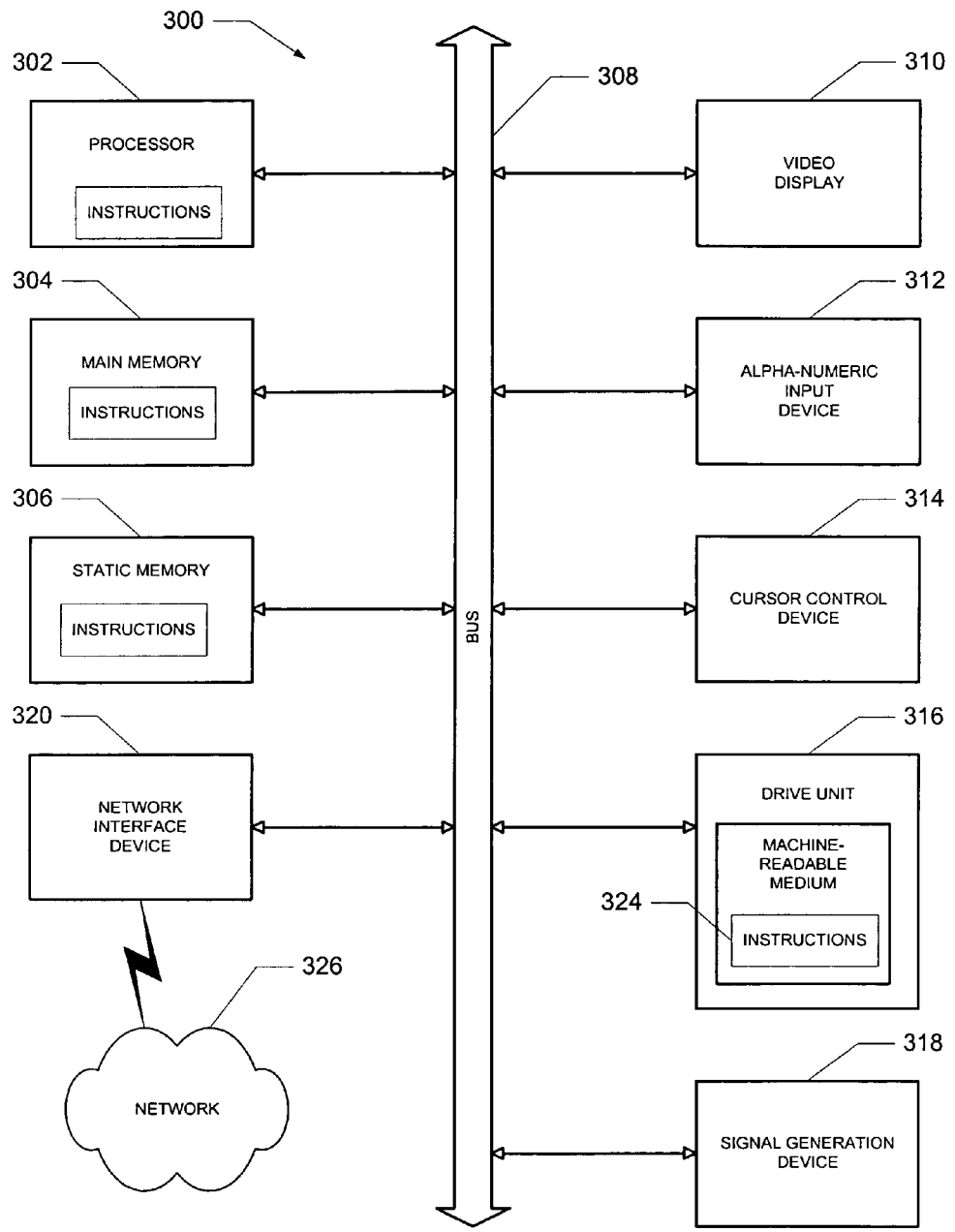
FIG. 7 is a block diagram showing a machine for performing any one of the exemplary methods described herein.

FIG. 7 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
defining, by use of a processor, a plurality of port groups associated with a bridging device, each port group of the plurality of port groups including a plurality of interfaces linked to the bridging device, the plurality of the interfaces of each port group being active during normal operations, the bridging device linking a first network to a second network;
defining a plurality of statuses for each port group of the plurality of port groups, a status for a port group being dependent on the individual statuses of each of the plurality of interfaces of the port group linked to the bridging device and including an associated predefined action, the predefined action being selected from the group: rerouting data, activating a backup device, and sending an error message, wherein the status of each port group of the plurality of port groups is dependent on the status of the bridging device;
defining at least one target port associated with each port group of the plurality of port, each target port relating to a path for data between the first network and the second network;
monitoring the status of the plurality of interfaces associated with each port group of the plurality of port groups, wherein monitoring the status comprising: monitoring the status of the bridging device, and determining the status of each port group of the plurality of port groups based on the monitored status of the bridging device and the monitored status of the plurality of interfaces associated with each port group of the plurality of port groups;
determining the status of each port group of the plurality of port groups based on the monitored status of the plurality of interfaces associated with each port group; and
in response to determining the status of a port group, triggering the predefined action associated with the port group status at one of the port group's target ports, the predefined action including creating a bridged path between the first network and the second network and by-passing the bridging device if the status of a port group associated with bridging device is determined to be inactive, the by-passing the bridging device including routing data on the bridged path through a network switch so that data is no longer routed through the bridging device.

2. The method of claim 1, in which monitoring the status of the plurality of interfaces comprises monitoring when a preselected number of ports in a port group go down, and triggering the predefined action in response to the monitoring.

3. The method of claim 1, wherein the predefined action bridges two Local Area Network (LAN) segments.

4. The method of claim 3, in which bridging the two LAN segments comprises dynamically changing a VLAN membership of at least one associated target port to a selected VLAN membership to by-pass the bridging device.

5. The method of claim 1, comprising storing information corresponding to the defined plurality of port groups, the plurality of interfaces associated with the plurality of port groups, the at least one target port associated with each port group of the plurality of port groups, and the predefined action for each status of a port group in a memory.

6. The method of claim 5, comprising accessing the memory to determine the status of each port group of the plurality of port groups and to obtain the predefined action associated with the port group status.

7. A non-transitory machine-readable storage medium having instructions embedded thereon, the instructions when executed by a machine cause the machine to:
define a plurality of port groups associated with a bridging device, each port group of the plurality of port groups including a plurality of interfaces linked to the bridging device, the plurality of the interfaces of each port group being active during normal operations, the bridging device linking a first network to a second network;
define a plurality of statuses for each port group of the plurality of port groups, a status for a port group being dependent on the individual statuses of each of the plurality of interfaces of the port group linked to the bridging device and including an associated predefined action, the predefined action being selected from the group: rerouting data, activating a backup device, and sending an error message; define at least one target port associated with each port group of the plurality of port, each target port relating to a path for data between the first network and the second network, wherein the status of each port group is further dependent on the status of the bridging device;

monitor the status of the plurality of interfaces associated with each port group of the plurality of port groups, wherein monitoring the status comprising:

monitoring the status of the bridging device, and determining the status of each port group of the plurality of port groups based on the monitored status of the bridging device and the monitored status of the plurality of interfaces associated with each port group of the plurality of port groups;

determine the status of each port group of the plurality of port groups based on the monitored status of the plurality of interfaces associated with each port group; and in response to determining the status of a port group, trigger the predefined action associated with the port group status at one of the port group's target ports, the predefined action including creating a bridged path between the first network and the second network and by-passing the bridging device if the status of a port group associated with bridging device is determined to be inactive, the by-passing the bridging device including routing data on the bridged path through a network switch so that data is no longer routed through the bridging device.

8. A system to reroute data over a local area network, the system comprising:

a port configuration module to:

define a plurality of port groups associated with a bridging device, each port group of the plurality of port groups including a plurality of interfaces linked to the bridging device, the plurality of the interfaces of each port group being active during normal operations, the bridging device linking a first network to a second network;

define a plurality of statuses for each port group of the plurality of port groups, a status for a port group being dependent on the individual statuses of each of the plurality of interfaces of the port group linked to the bridging device and including an associated predefined action, the predefined action being selected from the group: rerouting data, activating a backup device, and sending an error message, wherein the status of each port group is further dependent on the status of the bridging device;

define at least one target port associated with each port group of the plurality of port each target port relating to a path for data between the first network and the second network;

a detection module to:

monitor the status of the plurality of interfaces associated with each port group of the plurality of port groups, wherein the detection module is configured to monitor the status of the bridging device, and configured to connected to a processor to determine the status of each port group of the plurality of port groups based on the monitored status of the bridging device and the monitored status of the plurality of interfaces associated with each port group of the plurality of port groups; and a processor coupled to memory, wherein the processor is configured to:

determine the status of each port group of the plurality of port groups based on the monitored status of the plurality of interfaces associated with each port group, and trigger, in response to determining the status of a port group, the predefined action associated with the port group status at one of the port group's target ports, the predefined action including creating a bridged path between the first network and the second network and by-passing the bridging device if the status of a port group associated with bridging device is determined to be inactive, the by-passing the bridging device including routing data on the bridged path through a network switch so that data is no longer routed through the bridging device.

9. The system of claim 8, in which the detection module is configured to monitor when a pre-selected number of ports in a port group go down, and the processor is configured to trigger the predefined action in response to the pre-selected number of ports going down.

10. The system of claim 8, wherein the predefined action is to bridge two Local Area Network (LAN) segments.

11. The system of claim 10, in which bridging the two LAN segments is configured to dynamically change a VLAN membership of at least one associated target port to a selected VLAN membership to by-pass the bridging device.

12. The system of claim 11, further comprising a memory to store information corresponding to the defined plurality of port groups, interfaces associated with the port groups, the at least one target ports associated with each port group and the action for each status of a port group in a memory.

13. The system of claim 12, wherein the processor is configured to access the memory to determine the status of each port group of the plurality of port groups from the monitored statuses of the plurality of interfaces associated with each port group and to obtain the predefined action associated with the port group status.

\* \* \* \* \*

UNITED STATES PATENT AND TRADEMARK OFFICE
CERTIFICATE OF CORRECTION

PATENT NO. : 8,131,871 B2  
APPLICATION NO. : 11/331319  
DATED : March 6, 2012  
INVENTOR(S) : Christophe Paggen It is certified that error appears in the above-identified patent and that said Letters Patent is hereby corrected as shown below:

In column 8, line 4, in Claim 1, delete "port," and insert -- port groups, --, therefor.

In column 8, line 67, in Claim 7, delete "port," and insert -- port groups, --, therefor.

In column 9, line 48, in Claim 8, delete "port" and insert -- port groups, --, therefor.

Signed and Sealed this  
Twelfth Day of June, 2012

David J. Kappos  
*Director of the United States Patent and Trademark Office*